United States Patent [19]

Norman

[11] Patent Number: 4,506,847

[45] Date of Patent: Mar. 26, 1985

[54] THERMALLING SAILPLANE TURN INDICATOR

[76] Inventor: Colin D. Norman, 23 Abdale St., North Wavell Heights, Queensland, Australia

[21] Appl. No.: 499,148

[22] PCT Filed: Sep. 23, 1982

[86] PCT No.: PCT/AU82/00159
§ 371 Date: May 25, 1983
§ 102(e) Date: May 25, 1983

[87] PCT Pub. No.: WO83/01050
PCT Pub. Date: Mar. 31, 1983

[30] Foreign Application Priority Data

Sep. 25, 1981 [AU] Australia ............................. PF0918

[51] Int. Cl.³ ...................... B64C 31/02; G01M 5/100
[52] U.S. Cl. ..................................... 244/1 R; 244/16; 73/802
[58] Field of Search ................. 244/1 R, 16, 76 C, 82, 244/198; 73/147, 178 R, 802; 33/DIG. 13

[56] References Cited

U.S. PATENT DOCUMENTS 3,136,154 6/1964 Christensen .......................... 73/775
3,798,971 3/1974 Lowrance ............................. 244/16
3,842,509 10/1974 Wyman et al. ............... 33/DIG. 13
3,991,618 11/1976 Stampfer et al. ............. 33/DIG. 13

FOREIGN PATENT DOCUMENTS 64197 12/1945 Denmark ............................. 244/16

Primary Examiner—Trygve M. Blix
Assistant Examiner—Rodney Corl

[57] ABSTRACT

A thermal indicator with a sensor (28) mounted over the wing stubs (12, 13) of a sailplane to detect relative movement therebetween due to bending moments applied to the wings on meeting a thermal and a processor of the sensor signals to generate signals indicative of the direction to be turned to enter the thermal. The processor signals are suitably displayed to indicate thermal strength, and left or right directions to enter the thermal.

5 Claims, 3 Drawing Figures

THERMALLING SAILPLANE TURN INDICATOR

TECHNICAL FIELD OF THE INVENTION

This invention relates to a instrument for indicating the direction to turn in order to move into a thermal when gliding.

BACKGROUND ART

In gliding, a pilot seeks to take advantage of thermals, or up-currents of air, and conversely to avoid sinks, or down-draughts. By skilful utilisation of thermals, the gliding time may be greatly prolonged.

On approaching one side of a thermal, the wing on the thermal side should bend more than the other wing, even if only for a short time. To detect this strain gauges might be cemented to the wing spar stubs of a glider.

A difficulty with this approach is that when the strain gauges are applied to the surface of the wing spar stubs and this surface consists of fibreglass (or other) rovings that have a protective as well as a structural function, the strain recorded is not always directly related to wing bending. To overcome this the strain gauge could be set in the material at manufacture. Another practical difficulty with this approach is that since the wings are removable from the fuselage and the strain gauges are attached to the wings, a tedious system of electrical pin type connectors must be coupled for rigging and uncoupled for de-rigging.

OUTLINE OF THE INVENTION

An object of the present invention is to provide a thermal indicator for a glider which will react sensitively to, and give the pilot clear indication of, the effect of a thermal on one wing of his glider, so that the pilot can promptly turn the glider towards the thermal. Up-currents of air may also be organized in streams or streets and the invention may also give indications that will allow the pilot to turn toward and thus fly in such up-currents. Other objects and advantages of the invention will hereinafter become apparent.

The present invention achieves its objects by provision of a thermal indicator for indicating the entry of either wing of an aircraft into a thermal and/or the direction of turn required in order to obtain lift off said thermal characterised in that it comprises a sensor for detecting bending moments applied to said wing upon entry of said wing into said thermal, processing means for receiving an output of said sensor, processing said sensor output and providing an appropriate output to a display means, said processing means being operably coupled to said sensor, and display means for providing a visual and/or audio indication of either of or both of the presence of a thermal and the direction to turn in order to enter said thermal, said display means being operably coupled to said processing means.

In order that the invention may be more readily understood and put into practical effect, reference will now be made to the accompanying drawings which illustrate a preferred embodiment thereof and wherein:

METHOD OF PERFORMANCE

Figure 1:
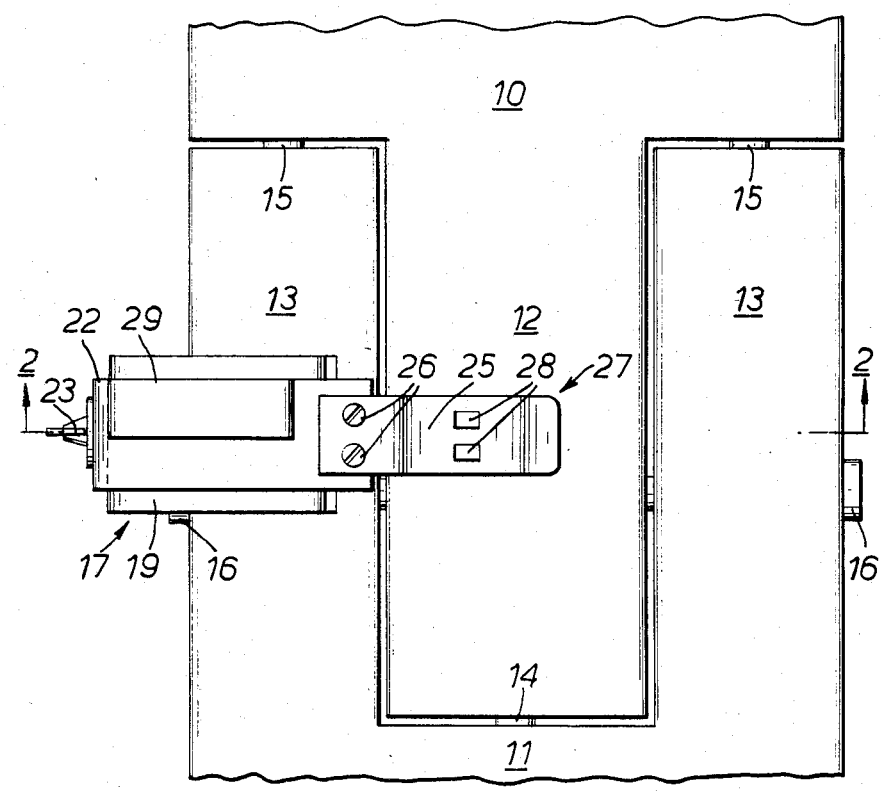
FIG. 1 is a plan view of the instrument applied to the wing stubs of a glider.
Figure 2:
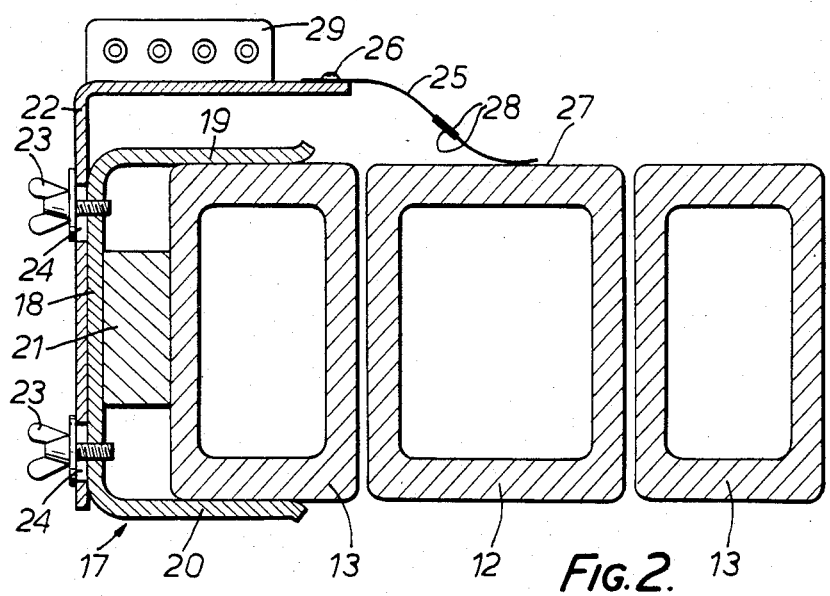
FIG. 2 is a sectional view along line 2—2 in FIG. 1.

The two wings of a glider, the inner end portions of which are indicated at 10 and 11, are demountable from the fuselage, being inserted in the fuselage from opposite sides and centrally interengaged within the fuselage, a wing stub 12 formed integrally with and extending from the wing 10 engaging closely between a pair of wing stubs 13 formed integrally with and extending from the other wing, 11, a pin 14 on the wing stub 12 being movably socketed in the wing 11 and pins 15 on the wing stubs 13 being likewise movably socketed in the wing 10, pins 14 and 15 being socketed in wings 11 and 10 respectively without bending restraint on the wing stubs 12 and 13. A retaining pin 16 passed transversely through registering holes in the two wing stubs 13 and the interposed wing stub 12 releasably couples the two wings in their engaged or operative positions. The pin coupling position determines the extent of bending movement of the wing stubs and ensures that the wing stubs will not move apart during flight and acts as thus connected without placing bending restraint on the wing stubs 12 and 13.

The instrument may include a spring clamp 17 releasably engaged on one of the wing stubs 13 and consisting of an upright 18 and top and bottom jaws 19 and 20 engaging the middle, top and bottom parts of the wing stub 13, a spacer block 21 being interposed between the clamp upright 18 and the outer side of the wing stub 13.

The drawings illustrate wings comprised of three interlocked wing stubs, one on one wing received between two on the other. The invention is equally applicable to wings comprising single wing stubs at each wing interlocked side by side. In all its applications the sensor is mounted on a support upon one stub to detect movement between it and an adjoining stub. With the arrangement of stubs illustrated it is possible to mount the sensor upon a cantilevered arm or simply supported beam bridging across the centre stub. The cantilevered arm or simply supported beam should be sufficiently rigid that acceleration forces cause deformations which are negligibly small compared with the differential movement between the spar stubs and so effectively eliminate spurious outputs from the sensor. The rigid support might be provided with set screws at one or both ends to adjust the sensors positioning relative to the wing stub enabling its fine adjustment.

By choice of particular modes of clamping, it is possible to mount the sensor upon a support which does no damage to the wing spars and enables decoupling of the sensor and its electrical leads upon removal of the wings without damage to the indicator parts should disassembly be performed without thought given to the sensor.

Where strain gauges are employed on a flexible leaf, bending of the leaf may be limited by appropriately placed stops, to limit bending such that it is never overloaded in normal adjustment or while de-rigging. The strain gauge support leaf might be rotationally mounted on a support beam to enable its location in a line which deletes all but wing bending moments from those forces which might otherwise act upon the gauge. Signals indicating the wrong thermal strength might arise where wing stub strengths are not the same. Rotation of the leaf may be used to offset this type of effect.

Figure 3:
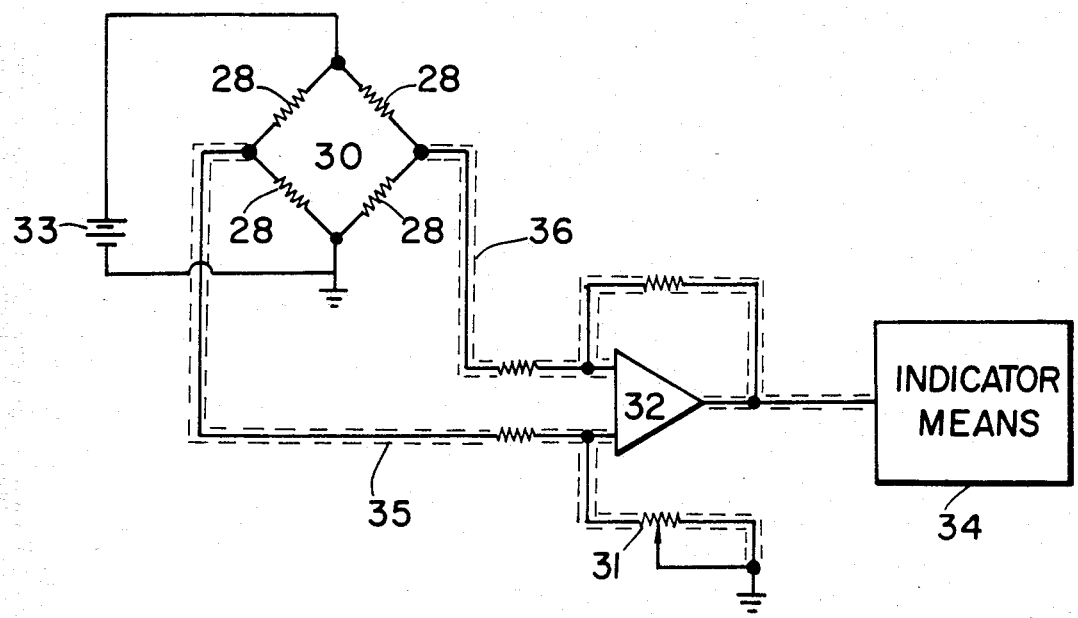
FIG. 3 is an electrical diagram which may be used in carrying out the invention.

A carrier bracket 22 of inverted L-shape may be secured adjustably to the clamp upright 18 by a pair of wing-head screws 23 passed through upright slotted holes 24 in the bracket and engaged in threaded holes in the clamp upright. A sensor leaf 25, consisting of a strip of resilient thin sheet material such as spring steel or other resiliently deformable material, can be secured at one end by a pair of screws 26 to the distal end of the top or horizontal arm of the carrier bracket 22, and might be formed with an S-bend in side view, so that the sensor leaf curves downwardly to bear lightly, but positively, upon a smooth plane surface 27 on the wing stub 12. This surface 27 may be formed directly on the wing stub 12, or may be a metal or other plate inset in and secured to the wing stub. Four strain gauges 28 are cemented to the sensor leaf 25, two above and two directly below, in or near the position of maximum bending moment. The gauges 28, which can be protected by any suitable waterproof covering material, are connected permanently into a Wheatstone bridge 30 as shown in FIG. 3 and which may be balanced by resistor 31 before use from the Wheatstone bridge. The leads may be carried to a terminal board 29 on the clamp 17 and connected by a suitable plug and cable (not shown) to an amplifier 32 which preferably is designed to operate on a power source 33 of twelve volts or less, and thus consumes minimal current, and will continue operating effectively during long flights using commonly used batteries which are not being recharged in flight. When the Wheatstone bridge 30 is unbalanced by a differential strain, the consequent electrical output, amplified by the amplifier 32, is indicated by any suitable indicator means 34 located conveniently to the pilot.

The amplifier may be housed in a metal box (not shown), and the cable to it shielded as shown at 35, 36 to prevent interference from radio signals. A high degree of amplifier stability can be incorporated to reduce to a minimum drift of the displayed value from the actual value. Out signals from accelerometers and/or strain gauges on the control column of the glider may be used in a separate Wheatstone bridge circuit to counter differential wing stub movement introduced by control movements of the glider.

The indicator means 34 responding to the amplifier output indicates the presence of a thermal and thus in effect provides an indication of temperature differential. Ambient temperature changes being small and gradual compared to impulsive thermal changes, the indicator will effectively respond to thermals, to the exclusion of ambient temperature changes. If determination of ambient temperature is important the indicator, for example shown in FIGS. 3 and 4 of U.S. Pat. No. 3,798,971 may be used for the indicator means 34. The sensitivity of the apparatus can be adjusted to enable the apparatus to respond only to thermals and not to spurious signals. Thus, bending arising out of weak thermals, control movements, etc., need not give rise to an output signal from the amplifier 32. The entry of a wing tip into a thermal induces a characteristic impulsive wing movement and the amplifier sensitivity may be adjusted to set a particular minimum strength thermal before the indicator is activated.

The indicator means employed may be of any suitable known type and may comprise indicator means such as shown in FIGS. 3 and 4 of U.S. Pat. No. 3,798,971, the indication given to the pilot being visible and/or audible and/or tactile. If a thermal exerts lift on one of the glider wings, the differential strain on the upper and lower gauges of the sensor leaf consequent upon the relative movement of the wing stubs results in (for example) the needle of a visual indicator being moved to one side of a zero mark (see FIG. 4 of U.S. Pat. No. 3,842,509), preferably in the direction towards that wing, giving the pilot clear indication that he should steer towards that side to take maximum advantage of the thermal. The instrument should preferably be used in conjunction with existing variometers that indicate whether the glider is rising or falling. Thus, if the instrument needle remains central, the variometer increasing, the pilot will not turn; if the needle moves left, the variometer increasing, the pilot will turn left; and if the needle swings right, the variometer increasing, the pilot will turn right. A continuously variable or stepwise sensitivity (amplifier gain) adjustment is preferably provided so that as the thermal strength increases the gain can be reduced to suit conditions and vice-versa as the thermal strength reduces. The Wheatstone bridge balancing adjustment 31 is provided to allow initial setting up deflections of the sensor to be balanced out and also to allow the meter needle to be centralised in flight.

The indicator may be calibrated to show the strength of a thermal. This degree of strength may, for example, be shown by the reading of a needle against a calibrated dial, or by frequency of an audible signal or brightness of a signal light.

The instrumentation may include any suitable adjustable device for giving visible and/or audible indication of lift of any predetermined value under one wing, so the pilot will be given clear indication of the influence of a thermal of any chosen strength.

Because the measuring device need not be rigidly connected to the two wing stubs and because it measures at right angles to the axis of the wing stubs, the device need not be affected by any differential axial movement between the wing stubs.

The measuring device or transducer for measuring differential movement of the wing stubs may be of many types other than the sensor leaf and strain gauges above described. For example it may be preferred to use a differential transformer, Hall effect type transducer, dial gauges, proximity sensors, magnet and coil, opticalelectronic devices, optical lever, capacitance type transducer, inductive type transducer, resistive type transducer, strain gauge diaphragm or any other device for measuring small movements.

In another embodiment, a mounting bracket is releasably clamped on the middle part of one wing stub and supports a carrier for a direct current operated differential transformer (DCDT) the central armature of which extends downwardly into contact with a bearing pad on the middle part of a stub of the other wing. The armature of the DCDT incorporates screw-threaded or other suitable adjustment means whereby pressure applied by the armature on the pressure pad may, if necessary, be adjusted from time to time by the pilot. The electrical output from the DCDT, which is proportional to the movement of the central armature, is amplified and indicated generally as before described. Pins 14, 15 serving as they do as coupling means for coupling the the wing stubs should be sufficiently strong to this end and may be made, for example, of stainless steel.

Apparatus according to the invention will be found to be very effective in achieving the objects for which it has been devised. It will, of course, be understood that the various embodiments of the invention herein described by way of illustrative examples may be subject to modifications of constructional detail and design, which will be readily apparent to persons skilled in the technology, without departing from the scope and ambit of the invention.

I claim:

1. Apparatus for indicating the entry of either of the removably mounted wings of a sailplane into a thermal and the direction of turn required in order to obtain lift from said thermal and comprising sensor means for detecting bending moments applied to a wing upon entry of said wing into a thermal, said sensor means providing an output when said plane enters a thermal, indicating means provided with said output for indicating the presence of a thermal and the direction to turn in order to enter said thermal, said sensor in use being mounted over juxtaposed wing stubs upon one of the removably mounted wings and comprising a rigid cantilevered or simply supported beam operatively removably connected to said one wing, said beam extending over a proximate region of the wing stub of the other wing, and a relative displacement detector supported on said beam and contacted with said other wing stub for detecting relative movement between said one wing and the wing stub of the other wing.

2. Apparatus as claimed in claim 1, wherein the beam is cantilevered from or simply supported by a carrier bracket mounted to said one wing, said detector comprising strain gauges mounted to an elongate resilient means one end of which is connected to the free end of the beam and its other end biased into engagement with the other wing stub, said strain gauges being electrically connected in a bridge circuit for providing an output indicative of the relative movement of one wing in relation to the other on entering thermals.

3. Apparatus as claimed in claim 3, wherein the output of the bridge circuit is fed to an amplifier for amplifying the bridge circuit output, and indicating means responsive to said amplifier output for providing a sensible indication thereof.

4. Apparatus as claimed in claim 3, wherein the bridge circuit comprises a Wheatstone bridge circuit the connections from which are shielded to prevent interference from unwanted signal sources.

5. Apparatus according to claim 5, wherein said bridge circuit includes a null point setting means for setting said indicating means to a null point in the absence of an output from said sensor means.

* * * * *